F. BECHER.
PISTON VALVE.
APPLICATION FILED AUG. 24, 1909.
1,089,357.
Patented Mar. 3, 1914.
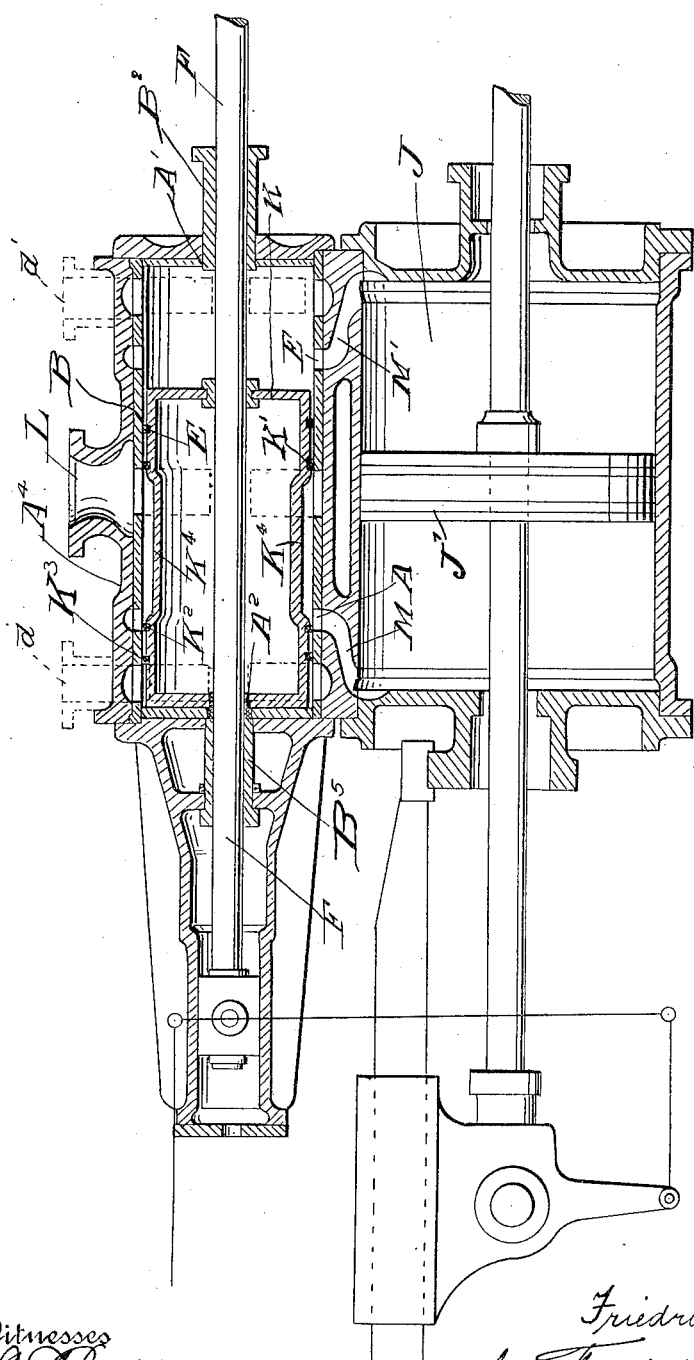

UNITED STATES PATENT OFFICE.

FRIEDRICH BECHER, OF LANDSBERG-ON-THE-WARTHE, GERMANY.

PISTON-VALVE.

1,089,357.  
Specification of Letters Patent.  
Patented Mar. 3, 1914.

Application filed August 24, 1909. Serial No. 514,377.

*To all whom it may concern:*

Be it known that I, FRIEDRICH BECHER, a subject of the German Emperor, and resident of Landsberg-on-the-Warthe, Germany, have invented certain new and useful Improvements in Piston-Valves, of which the following is a specification.

This invention relates to improvements in piston valves, and one of the principal objects is to maintain a very slight and minute clearance space between the piston valve and its liner, and to slidably mount the piston valve in such a manner that it will be rigidly held in such concentric spaced relation with respect to its liner as to maintain such clearance constant.

Generally speaking, further objects of my invention are to enable the piston valve to be actuated with a minimum consumption of power to avoid rapid wear of the piston valve and of the faces of the liner, and to guard against loss of fluid pressure through leakage.

A further object of my invention is to prevent the piston valve from exerting a lateral pressure against the wall of its liner due to high pressure fluid acting upon the piston valve. This last mentioned object is attained by centering the piston valve and liner, which are disposed to be acted upon only by the exhaust or low pressure fluid, while the by passes of the piston valve are separated by packing rings which packing rings cannot become worn eccentrically by pressure because of the concentric guiding of the valve.

The drawing illustrates a longitudinal sectional view of a piston valve embodying my invention applied to the cylinder of a steam engine.

In the drawing, the piston valve is shown as applied to the cylinder J of a locomotive or other steam engine. The piston cylinder B is provided with suitably arranged ports A and E which are disposed adjacent the channels M and M' respectively of the cylinder J, and it will be seen that through these channels steam is fed to and exhausted from the cylinder J, alternately at opposite ends. The casing $A^4$ housing the piston cylinder is provided with grooves adapted to aline or register with the ports A and E for directing the spent or used steam to the respective exhaust ports $d$ and $d'$, located adjacent the ends of the valve casing as clearly shown by the drawing.

The piston cylinder is provided at its opposite ends with openings A' and $A^2$, which in turn have suitable bearing plates $B^2$ and $B^5$ acting as packing to prevent the loss of steam between the stem $f$, and the openings through which they operate. Utility of the latter will be hereinafter more fully described.

The piston valve K which is preferably hollow is of slightly less diameter than the piston cylinder, and is provided with a head E' on each end thereof. Intermediate its length, the piston valve is provided with a circumferential depression $K^4$ which forms with its liner, a suitable steam passage.

Rigidly secured to the piston valve is a stem $f$ which extends through the piston valve, and the ends thereof as before stated are positioned in the openings in the ends of the piston cylinder for holding the piston valve alined and equally balanced at all times within the piston cylinder.

Each of the piston valve heads is provided with circumferential grooves $K^2$ which form pockets for receiving packing rings $K^3$ for forming a steam tight joint between the piston valve and its liner, viz: the piston cylinder.

The operation of the device is as follows: As shown in the drawing, the piston valve K is in a position to receive a supply of steam through port L which is in connection with the source of steam supply in any well known manner. Steam enters the piston cylinder and circulates around the piston valve K in the circumferential steam passage and in this way distributes the pressure of the steam equally around the said piston valve K. From the circumferential steam passage the steam enters through opening A and engages the piston J' operating in the cylinder J which is accordingly moved the length of the piston stroke. On the reverse movement of the piston valve, steam enters the cylinder through port E and channel M' where its force is exerted against the opposite side of the piston J' with the result of moving the piston J' its full stroke in its opposite direction, thereby forcing the spent steam through channel M where it is exhausted through the exhaust port $d$. This operation is repeated until the supply of steam to the controller valve is checked and the machine to which it is applied is stopped.

What I claim is—

1. In a piston valve, the combination of a piston cylinder formed with inlet and outlet ports, a reciprocating piston valve in the piston cylinder, the diameter of the piston valve being less than the interior diameter of the piston cylinder, the piston valve having a depressed portion to form with the piston cylinder an annular passage, packing rings on the piston valve to pack the space between the piston cylinder and said piston valve, whereby steam in the piston cylinder between the ends of the latter and the ends of the piston valve, and in the annular passage between the piston valve and piston cylinder equalizes the pressure entirely around the piston valve, and guiding means for holding the piston valve concentric with the piston cylinder.

2. In a piston valve, the combination of a piston cylinder formed with inlet and outlet ports, a reciprocating piston valve in the piston cylinder, said piston valve having a depressed portion to form with the piston cylinder an annular passage, packing rings on the piston valve to form a tight joint between said piston cylinder and said piston valve, whereby the steam in the piston cylinder between the ends of the latter and the ends of the piston valve, and in the annular passage between the piston valve and piston cylinder equalizes the pressure entirely around the piston valve, stems extending from opposite ends of the piston valve, said stems forming guiding means for holding the piston valve centrally disposed during its reciprocation.

In testimony whereof I have hereunto set my hand in presence of two witnesses.

FRIEDRICH BECHER.

Witnesses:
 HENRY HASPER,
 WOLDEMAR HAUPT.

---

Copies of this patent may be obtained for five cents each, by addressing the "Commissioner of Patents, Washington, D. C."